Dec. 12, 1944.   H. O. KAMPSTAD ET AL   2,364,855
MEANS FOR MOUNTING AND SUPPORTING MOTORS
Filed Dec. 31, 1941   2 Sheets-Sheet 1

Inventors:
Henry O. Kampstad.
Clarence L. Kampstad
By *H. H. Whiteley*
Attorney

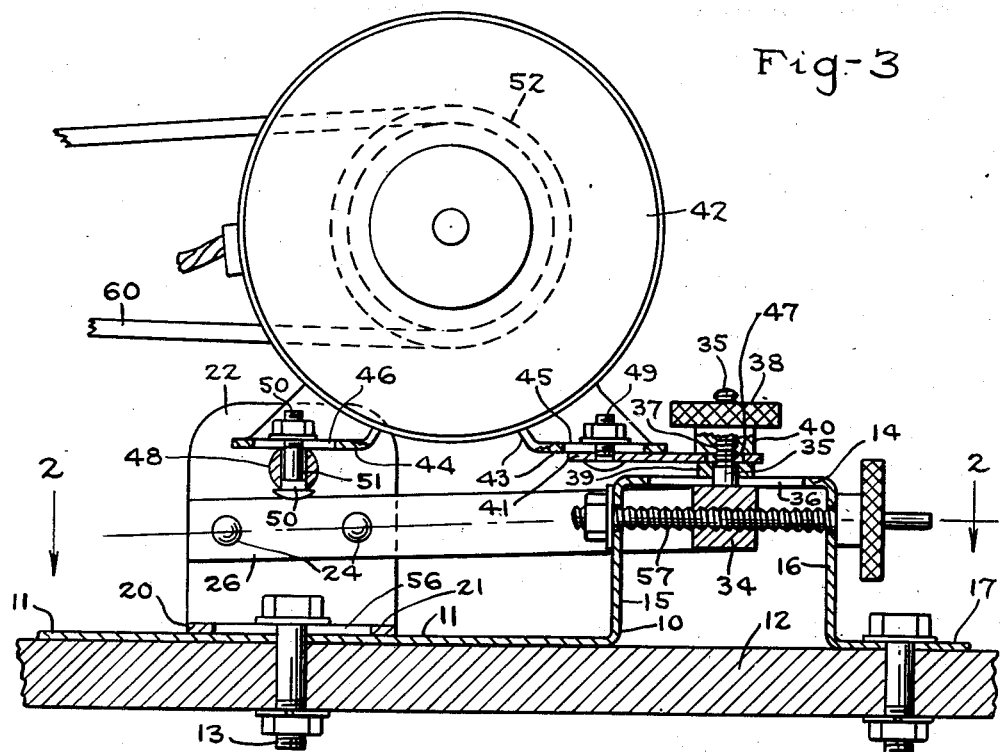
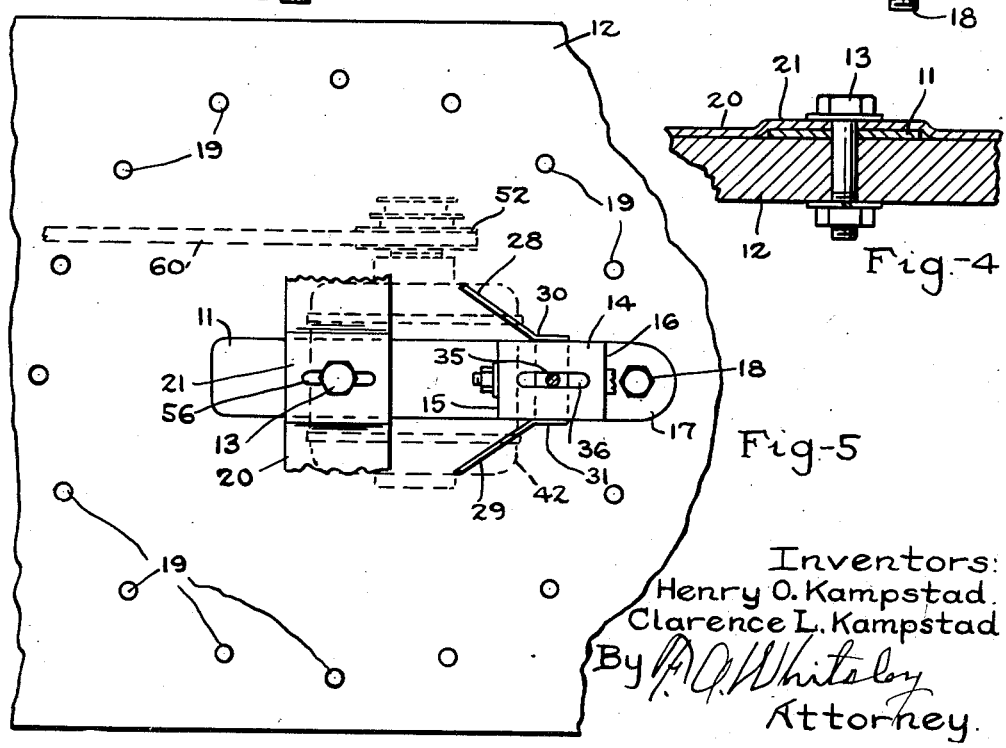

Patented Dec. 12, 1944

2,364,855

UNITED STATES PATENT OFFICE 2,364,855

MEANS FOR MOUNTING AND SUPPORTING MOTORS

Henry O. Kampstad and Clarence L. Kampstad, Lengby, Minn.

Application December 31, 1941, Serial No. 425,106

5 Claims. (Cl. 248—23)

Our invention relates to means for mounting and supporting motors, and has for its object to so mount and support a motor that it may have its drive shaft and pulley thereon moved both angularly and laterally so as to aline the said pulleys or any of them with the pulley of the instrumentality to be driven by the motor.

In shops, barns, basements and the like, it is customary to employ a motor, either an electric motor or other form of motor, such as a gas operated motor, for driving some operating machine or machines. It is of course essential that the motor be supported in rigid relation to the machine which is to be operated. In practice a motor shaft will have secured thereon either a pulley or a cluster pulley formed of pulleys of different sizes which operate through a belt to drive some machine. It is of course essential that the particular driving pulley of the motor and the driven pulley of the machine shall be in alinement along common vertical planes and that the space between the driving pulley of the motor and the driven pulley of the machine shall be so adjusted that the belt will be drawn sufficiently tight to have the greatest degree of operative efficiency. It also frequently happens that the same motor is employed to drive a number of different machines operatively grouped about the motor. Under such conditions grave difficulties have been encountered in getting proper alinement of the driving pulley of the motor and the driven pulley of the machine in any instance, and further difficulties have been encountered in realining the driving pulley of the motor to be belted up to the driven pulley of another machine.

It is an object of our invention, therefore, to provide a mounting for the motor whereby all necessary shifts of position may be made either angularly with respect to the machine to be driven or laterally or longitudinally of the motor itself.

It is an object of our invention, therefore, to mount the motor upon a base support in such manner that the motor and its driven belt may be moved laterally and longitudinally of said support so that the driving pulley of the motor may be brought into vertical plane alinement with the driven pulley of a machine and the distance between the said driving pulley and driven pulley may be regulated to produce suitable tightening of the belt.

It is a further object of our invention to mount the aforesaid supporting frame upon a table so that said frame and the motor supported thereby may swing on a central pivot on said table to put the driving pulley of the motor into any desired angular position so as to be alined with the driven pulley of an adjacent machine.

It is a further object of our invention to provide a suitable series of holes about said central pivot together with means for securing the motor-supporting frame to the table at said central pivot and with means for securing said frame in any desired angular position through any of said encircling group of holes.

It is a further object of our invention to provide a supplemental frame supporting the motor itself which shall be adjustable longitudinally of said pivoted frame together with means for making such longitudinal adjustment and means for locking the frame in any adjusted position.

It is a further object of our invention to mount the motor itself on said supplemental frame in such manner that it may be moved laterally thereon as desired to bring its driving pulley into alinement with the driven pulley of an adjacent machine.

The full objects and advantages of our invention will appear in connection with the detailed description thereof given in the appended specification, and the novel features of our invention by which the aforesaid advantageous results are produced will be particularly pointed out in the claims.

In the drawings illustrating an application of our invention in one form:

Fig. 3 is a side elevation part sectional view of the invention as shown in Fig. 1.

Fig. 4 is a fragmentary enlarged sectional view taken on line 4—4 of Fig. 2.

Fig. 5 is a reduced scale plan view of the invention, as shown in Fig. 1, showing how the pivoted supporting frame is positioned on a table for adjustment into any of a number of desired angular positions.

Figure 1:
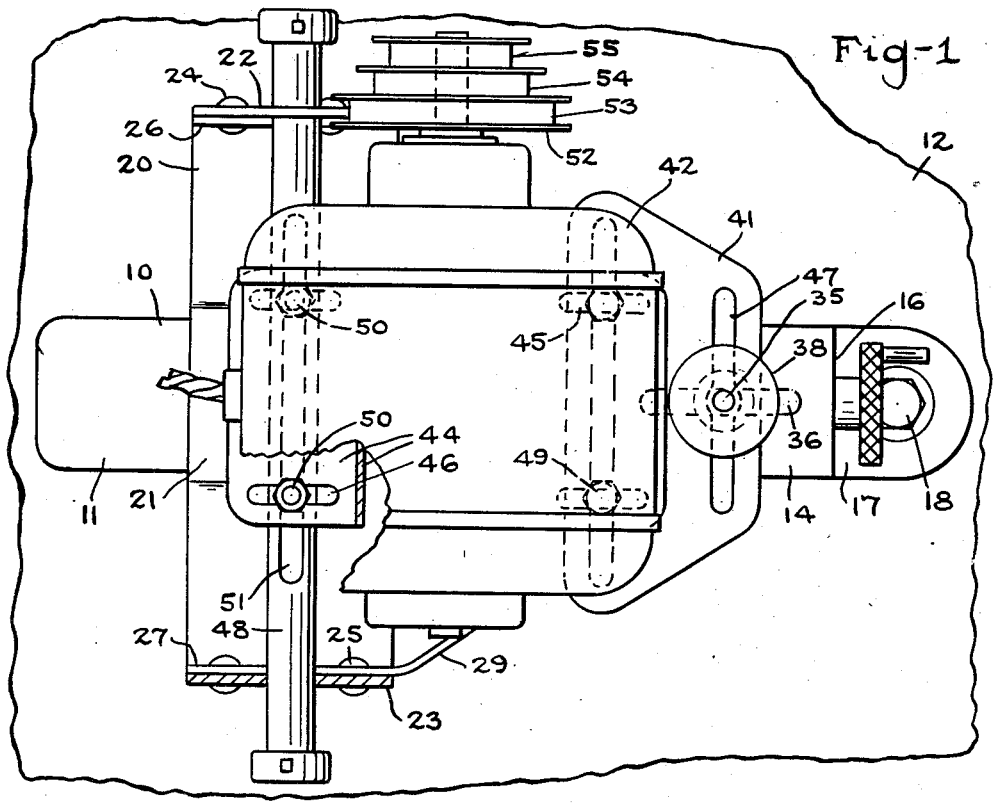
Fig. 1 is a plan view of the invention with some parts broken away and in section.
Figure 2:
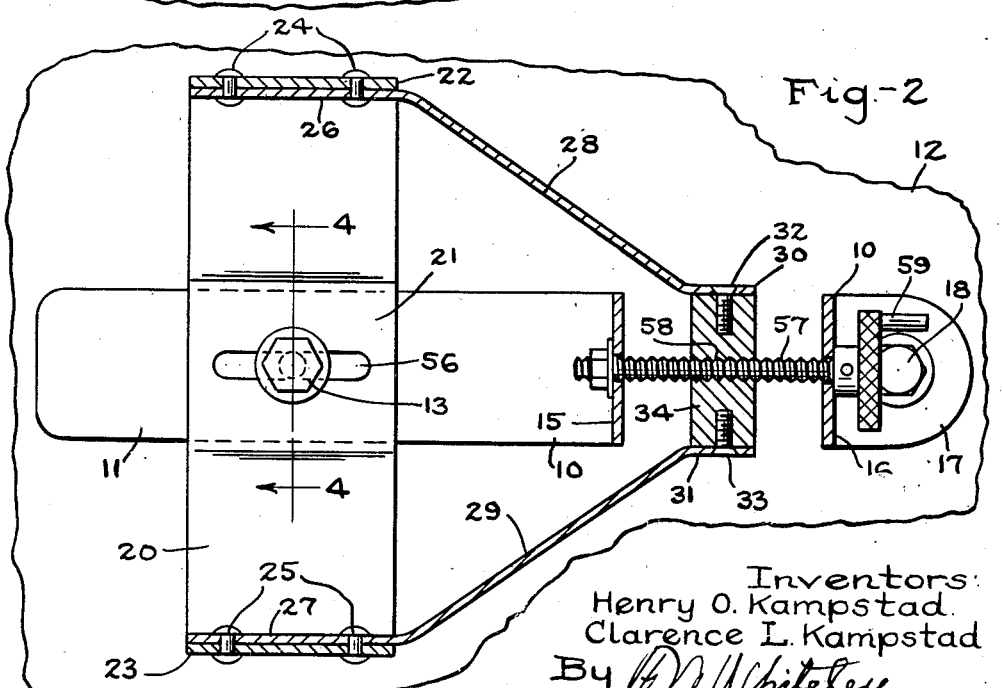
Fig. 2 is a sectional plan view taken on line 2—2 of Fig. 3.

As illustrated, a base frame member 10, Figs. 2 and 3, comprises a bottom plate 11 contacting any understructure such as the top plate 12 of a table, and is secured thereto so as to pivot thereon by means of a bolt 13 passing through the table top 12 and through the bottom plate 11, as best shown in Fig. 3. The base frame member 10 is provided with a U-shaped upwardly extending table portion 14 supported by vertical legs 15 and 16 of the bottom plate 11 which is continued at 17 where a second bolt 18 further secures the base frame member 10 to the table top 12. The table top 12 is provided with a series of holes 19, Fig. 5, for receiving the bolt 18. It will be apparent from this arrangement that the bolt 13 serves as a pivot about which the base frame member 10 may be swung throughout an entire circle, the bolt 18 being passed through any one of the holes 19 for securing the base frame member 10 in any desired angular position on table top 12 to bring the driving pulley on the motor into alinement with a selected pulley on any machine positioned about table top 12. Mounted upon base frame member 10 is a transverse plate 20, Figs. 1 and 2. This plate, as shown in Fig. 4, overlies the bottom plate 11 of base frame member 10 and is provided with a raised portion 21 for receiving said bottom plate 11 to bring the parts of the transverse plate 20 at each side of the bottom plate 11 into the plane of the surface of the table top 12. The ends of plate 20 are provided with upstanding ear or bracket portions 22 and 23 to which are secured by means of bolts 24 and 25 longitudinal frame pieces 26 and 27.

The pieces 26 and 27 will preferably be secured so as to extend at a slightly ascending angle, as shown in Fig. 3, and these pieces have inwardly bent portions 28 and 29, Fig. 2, which approach close to each other and terminate in parallel portions 30 and 31 where they are secured by screws 32 and 33 to a block 34 extending between uprights 15 and 16 and with the plane of the block substantially in the plane of the under surface of table 14. The block 34 is formed with a central upstanding pin 35, Figs. 1 and 3, which extends through a longitudinal slot 36 in the table 14. The pin 35 is threaded as indicated at 37, Fig. 3. And a thumb nut 38 is adapted to be screwed upon said threaded portion 37. A clamping plate 39 rests upon table 14 across slot 36 with pin 35 extending through it; and the base 40 of thumb nut 38 engages a bracket plate 41 between the clamping plate 39 and base 40 of thumb nut by which the bracket plate 41 is rigidly held extended inwardly above the block 34. The motor 42 has the customary supporting legs 43 and 44 with longitudinal slots 45 and 46 therein. The leg 43 rests upon the bracket plate 41 over a transverse slot 47 therein, Figs. 1 and 3, and the leg 44 rests upon a shaft 48 mounted in the ears or upstanding portions 22 and 23. Bolts 49 secure the leg 43 to the bracket plate 41 and bolts 50 extend through the longitudinal slots 46 of leg 44 and through an elongated slot 51 along supporting shaft 48. The motor is thus mounted upon the motor support over base frame member 10 for lateral adjustments along slots 47 and 51. To make these adjustments it is only necessary to loosen set bolt 38 and bolts 50 and the motor may be slid in either direction on the bracket plate 41 and supporting shaft 48 to adjust the motor itself and its driving pulley laterally of the support. This pulley is indicated in dotted lines at 52 of Figs. 1 and 3. In practice it will be a cluster pulley made up of several pulley portions of different sizes such as indicated at 53, 54 and 55 of Fig. 1. The lateral adjustment above defined may bring any one of the pulley portions 53, 54 and 55 into alinement with the driven pulley on the machine which is to be driven.

To make longitudinal adjustment of the motor the motor support is adapted to be moved bodily longitudinally of the base frame. To effect this movement it will be necessary only to loosen the bolt 13 above slot 56 extending transversely of the plate member 20. A threaded rod 57 extends through a threaded opening 58 in the block 34 and is supported and restrained at each end by the opposite walls 15 and 16 supporting the table 14. A crank 59 on rod 57 is adapted to turn it in either direction which will move the motor support from plate 20 in either direction as desired to adjust the longitudinal position of the motor and of its pulleys whereby in any case a drive belt 60 may be suitably tightened.

The advantages of our invention will be apparent from the foregoing description. The fundamental advantage is that a motor may be so supported that its drive pulley or pulleys may be brought into proper alinement of any one of several operative machines grouped about the motor support such, for example, as a feed grinder, ensilage cutter or a pump in the tool room of a barn, or a washing machine, mangle or lighting instrumentalities in the laundry of a home. By the mere act of releasing certain easily turned bolts the motor itself may be moved laterally as desired for perfecting alinement of the motor drive shaft with the driven shaft of a machine. The entire support for the motor may be swung about a center to put the motor in general alinement with successive different machines, and the motor support itself may be moved longitudinally to get its drive pulley the right distance from the driven pulley of a selected machine to effect suitable tightening of the belt.

It is also a very great advantage in the use of our invention that our motor mounting makes possible the use of the motor for a number of instrumentalities without the use or expense of line shafts, line shaft bearings and the pulleys and belts necessary for line shaft transmission of power. Not only is this expensive and cumbersome form of transmission eliminated, but there is a direct hook-up from the power unit or driving unit to the mechanism which is to be operated and driven, which provides a saving in the advantage and operation of a great saving in the cost of power and energy.

It is a further advantage of our invention that it can be adapted to any type of motor, particularly any type of electric motor, that it is so simple and compact it does not require the room or space of operating devices necessary in the old line shaft forms of transmission and finally that the entire structure is simple and easily applied for any and all conditions of use for a motor. The elements making up the mounting are not expensive, are compactly assembled, are simple to construct and can be connected up for practical operation of any instrumentality simply and quickly and without the necessity of employing machinists or expert mechanics.

We claim:

1. A motor mounting comprising a unitary base frame member, a support to which the frame member is secured, said member being an elongated plate having a U-shaped bend therein to form a table, a motor support adapted to move along said base frame member toward and from said table, means connected with said motor support for directly supporting a motor, a motor thereon, and means associated with the table for moving the motor support along the base frame.

2. A motor mounting comprising a base frame member in the form of an elongated plate said plate being shaped to form a table supported thereby and having a longitudinal slot therein, a motor support having a portion engaging the frame member and another portion adapted to slide along said slot, a motor on said motor support, and means associated with the table for moving the support along the base frame.

3. A motor mounting comprising a base frame member in the form of an elongated plate, said plate being shaped to form a table supported thereby and having a longitudinal slot therein, a motor support having a portion engaging the frame member and another portion adapted to slide along said slot, a motor on said support, means associated with the table for moving the support along the base frame, said means comprising a block connected with said motor support having a threaded opening and a threaded rod cooperating with the threaded opening with means to rotate the rod to cause the support to be moved along the base frame, a support for the frame member, and connections thereto adapting the frame member to be turned into any desired angular position.

4. A motor mounting adapting a single motor to be set for pulley alinement to drive any one of a plurality of operating units grouped about and in different fixed angular relations to said motor, comprising a fixed table base, a unitary frame member centrally positioned thereon, and having extensive portions contacting the surface of the base, means for mounting a motor on the member, a centrally positioned bolt extending through the base and the member about which the member and parts carried thereby may be rotated through the arc of a circle to bring the pulley of any motor mounted on the member into alinement with the pulley of any of the operating units positioned about said motor mounting, and means for holding said member in contact with and fixed upon the table base in any selected position.

5. A motor mounting, comprising a unitary frame member in the form of an elongated plate having a portion forming upstanding legs and a raised table, means for supporting a motor, including a rear bracket having upstanding arms and a slotted bottom engaging a surface of the member, and including a front bracket having connection with a block under the table through a slot therein, the slots in the bottom and in the table being in longitudinal alinement, means uniting the brackets including a pair of links connected respectively to the arms and to the block, and a shifting screw and crank for operating it, said screw threaded through the block and supported by the legs for shifting the brackets, and a motor carried thereby along the member.

HENRY O. KAMPSTAD.
CLARENCE L. KAMPSTAD.